| United States Patent Office | 3,069,286
| --- | --- |
| | Patented Dec. 18, 1962 |

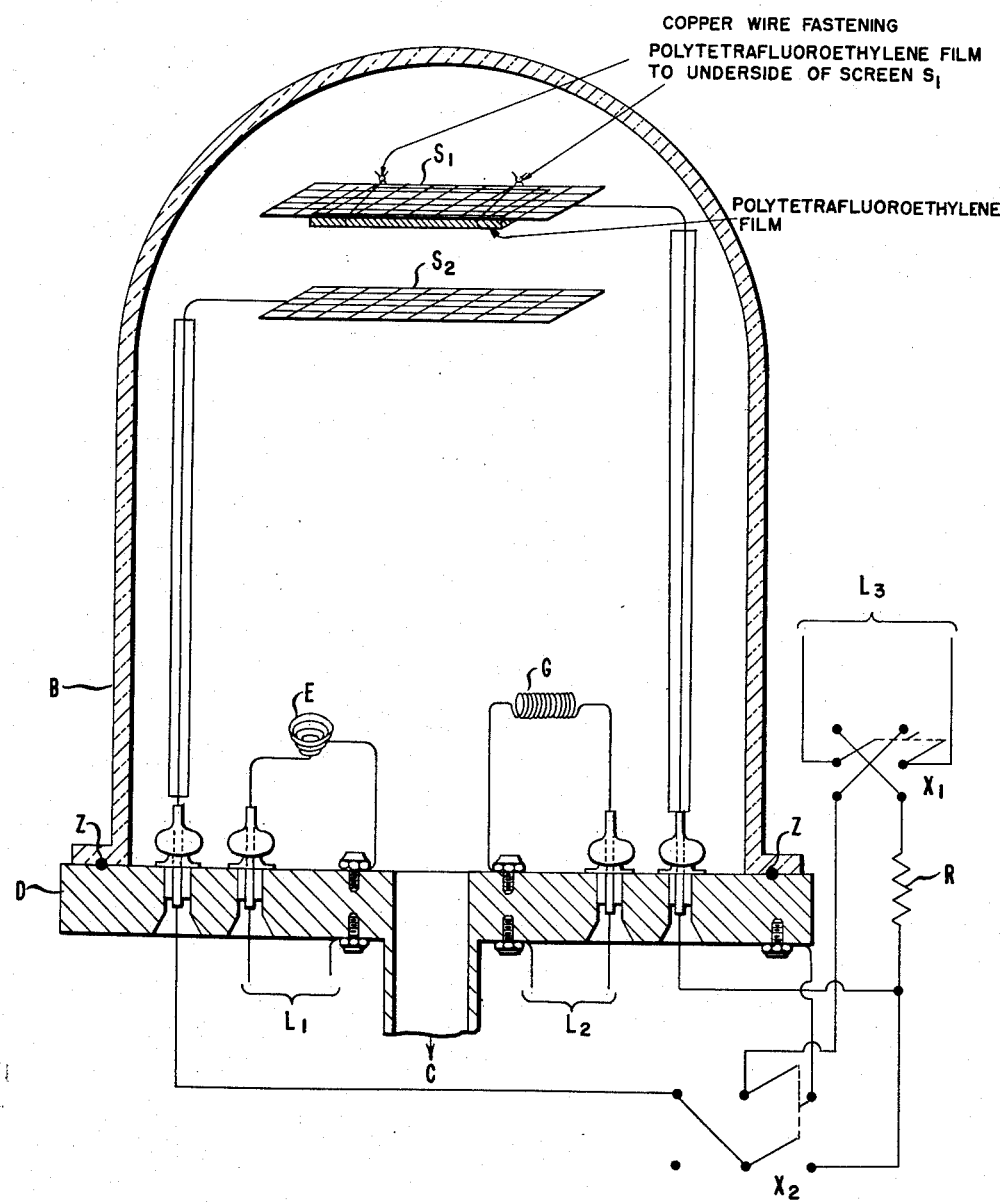

3,069,286
PREPARATION OF METALLIZED PERFLUORO-
CARBON RESINS
Maurice Barker Hall, Wilmington, Del., assignor to E. I.
du Pont de Nemours and Company, Wilmington, Del.,
a corporation of Delaware
Filed Aug. 7, 1958, Ser. No. 753,824
4 Claims. (Cl. 117—47)

This invention relates to metallized articles of perfluoroolefin polymers and their preparation. More particularly, it relates to metallized articles of tetrafluoroethylene resins and to a method for their preparation.

The production of adherent coatings on the surface of articles fabricated from perfluoroolefin polymers is particularly difficult in view of the waxy nature of the surface and the resultant poor adhesion of coatings. The problem is even more serious in the case of metal coatings on these polymers since an intermediate layer of adhesive is required which detracts from the electrical properties of the metal-coated article. Accordingly, there is need for improved processes for producing metal coatings on resins of this type.

It has now been found that the surface of perfluoroolefin polymers can be coated directly with an adherent layer of metal by vapor deposition of the metal onto the article during or after exposure to a rarified plasma of electrically energized gaseous particles having energies of 10 to 500 electron volts. In a preferred embodiment electrically energized particles having energies below 250 electron volts are employed.

The electrically energized particles employed in this process may be positively or negatively charged and may be of various masses. Combinations of positively and negatively charged particles may also be employed. Particularly suitable particles are electrons, hydrogen ions, and the like which may be produced, for example, by a heated filament, gaseous discharge, etc. Although electrons and hydrogen ions are preferred types of electrically energized particles because of the excellent adhesion resulting from their use, other ions such as those obtained from gaseous discharge in nitrogen, oxygen, helium, and argon can be effectively employed.

The process is preferably operated at pressures of a few millimeters of mercury and below. Excellent adhesion results from electrical excitation at pressures from about 1–3 millimeters although pressures as low as 100 millimicrons and below may be employed.

The nature of the gas which provides these pressures is not critical. Suitable gases include air, nitrogen, argon, helium and hydrogen. Of these, hydrogen is preferred since its presence leads to the production of metal coatings exhibiting greatly improved adhesion to the perfluoroolefin resin.

The process is carried out at ordinary temperatures and provision of external heating or cooling equipment is unnecessary.

The time of exposure of the resin to the electrically energized particles may vary over a wide range. In the apparatus described below, adherent metal coatings have been obtained after exposure times ranging from a few, i.e., about 10, seconds to several hours. The minimum time required is related to the current available and exposures shorter than 10 seconds are adequate when higher currents are employed. It is obviously desirable for economic reasons to avoid prolonged treatments and exposure times of less than 10 minutes are preferred.

It is convenient to deposit metal on the resin surface immediately after exposure. However, this is not necessary and metal coating may be deferred for periods of several days or weeks if necessary. The exposed but uncoated articles may be stored in air without detrimental effect, but should be protected from dust, finger marks, and the like.

The thickness of metal deposited on the activated surface is governed by the rate of evaporation and by the duration of exposure to metal vapor. Metal coatings ranging in thickness from very thin, semitransparent films of about one to ten microns in thickness up to opaque, lustrous coatings of sufficient thickness to serve as a base for the electrolytic deposition of additional metal can readily be prepared. Although thicker coatings can also be prepared by the process of this invention, it is preferred for economic reasons to employ electrolytic methods for preparation of thick layers of metal whenever possible. Formation of an adherent metal coating may be limited to selected areas on the resin surface by restricting the action of the electrically energized particles, e.g., by use of a mask, to those areas where such a coating is desired. Obviously, it is also possible to restrict the extent of the area coated during deposition of the metal so that a portion of the activated surface remains free of metal.

The process of this invention may be carried out in any equipment which provides the essential operating conditions as described above. A convenient form of equipment is illustrated in the attached drawing. Referring to the drawing, letter B represents a vacuum chamber having electrical leads L to the outside as indicated, and a conduit C to vacuum pumps, not shown. For treatment of small specimens, the upper part of this chamber may be conveniently constructed of glass to permit observation of the sample during treatment. The joint between the upper portion of the chamber and the metal base D is rendered gas-tight by means of gasket Z of rubber, neoprene or the like. Within the chamber, letter E designates a tungsten basket for containing the metal to be evaporated. This basket consists of a spiraled 20-centimeter length of 20-mil wire. G represents an electron emitter, hereinafter referred to as an electron gun, consisting of a spiraled 20-cm. length of 10-mil tungsten wire which is packed with a 50/50 (by weight) mixture of calcium and strontium oxides. $S_1$ and $S_2$ are electrodes consisting of ¼-inch mesh metal screen, fabricated from stainless steel or other suitable metals. The perfluoroolefin resin article to be treated is placed between these screens and may be supported from $S_1$, for example, by means of fine copper wire, or may rest on $S_2$. As indicated in the drawing, $S_1$ and $S_2$ are separated by a distance of one inch. However, larger or smaller separations may be employed, for example, to accommodate resin articles of various sizes.

The base of the vacuum chamber is provided with an opening through which gas can be removed or admitted and with electrical connections suitably insulated for the provision of current to the various electrical components within. The electron gun G and the tungsten basket E are supplied with alternating current by means of electrical leads $L_1$ and $L_2$ from filament transformers T (not shown), each capable of providing an output of 25 amperes at 7.5 volts. The primaries of these transformers are conveniently supplied with current from readily adjustable sources such as variable transformers. Direct current is supplied by means of leads $L_3$ from a power supply P not shown which is capable of delivering at least 200 milliamperes at 500 volts. Switches $X_1$ and $X_2$ are provided to enable connections to this power supply to be changed readily.

In one method of operation, connections are made so that the output of the power supply may be delivered between the screens, $S_1$ and $S_2$. Alternatively, the screens may be maintained at a fixed potential with respect to each other which may be either positive or negative with reference to the average potential of the electron gun G and the tungsten basket E. In this embodiment, the screens may be at the same potential, as in Example I, or at different potentials.

In practice, a glow discharge usually occurs in the vicinity of the sample after a short period of electrical excitation. This is accompanied by a pronounced increase in the current flow which is preferably limited, e.g., by a resistance R to a value which avoids damage to the power supply and to the object being treated. This value depends on a number of factors including size of object and capacity of the supply. In the examples below, a current of about 200 milliamperes was not exceeded, and the resistance R used was 715 ohms. For ease of adjustment, it is sometimes convenient to employ a variable resistance instead of the fixed resistance shown. Alternatively a variable power source may be employed.

Other arrangements of apparatus can be employed and in certain cases may present advantages over the particular arrangement described. For example, the screens, $S_1$ and $S_2$, may be placed in the lower portion of the chamber with the electron gun G and the evaporator E above. Alternatively, the screens, $S_1$ and $S_2$, may be cylindrical and placed concentrically with respect to the evaporator E and gun G. Still other modifications will occur to those familiar with this art.

The invention is illustrated by the examples below:

*Example I*

This example was carried out using an apparatus like that shown in the drawing. A film of polytetrafluoroethylene resin was attached with fine copper wire to the bottom of the screen $S_1$ in a position parallel to and between the screens $S_1$ and $S_2$, a small sheet of copper was crumpled and placed in the basket E and the vacuum chamber was evacuated to a pressure of about 20 microns of mercury. Hydrogen gas was admitted and the chamber again evacuated. This procedure of admitting hydrogen and evacuating was repeated twice more to insure thorough flushing of the system with hydrogen. After further evacuation for a period of about 15 minutes, during which time the pressure in the chamber dropped to below 20 microns of mercury, current was applied to the filament of the electron gun G and a direct potential of 120 volts was applied between the screens, $S_1$ and $S_2$, which were joined electrically, and the electron gun. Connections were so arranged that the screens were positive with respect to the gun. After the sample had been bombarded with electrons for a period of 1.5 minutes, evaporation of copper from the tungsten basket E was commenced. Electron bombardment was continued during the evaporation using a potential between the screens and the electron gun of 75 volts.

After about two minutes, the side of the film of polytetrafluoroethylene resin facing the gun and basket was coated with a layer of copper metal which exhibited diffraction colors toward its edges. The reverse side of the film was coated in a pattern corresponding approximately to the wire screen, i.e., the portions of the film adjacent to the openings in the screen were coated with metal while the portions adjacent to the wire of the screen were uncoated. The coatings on both sides of the film adhered strongly to the resin. In contrast, deposits of copper produced in a similar manner on a film of polytetrafluoroethylene resin without electrical excitation were bright and metallic in appearance but adhered very poorly.

*Example II*

In this example (which was carried out as described in Example I, the polytetrafluoroethylene resin film was bombarded with electrons under an accelerating voltage of 500 volts for 6 minutes. The electron gun and accelerating voltage were then turned off and the film allowed to stand for 6 minutes in vacuo. Evaporation of copper was then initiated and produced adherent copper-colored deposits on both sides of the film as described in Example I.

*Example III*

This example illustrates operation with the electron gun off and with a potential difference applied between the wire screens, $S_1$ and $S_2$. A film of polytetrafluoroethylene resin was attached with fine copper wire to the lower side of $S_1$, copper foil was placed in the basket E, and the apparatus was flushed several times with hydrogen as in Example I. Hydrogen was finally admitted to a pressure of several hundred millimeters of mercury and a voltage of 490 volts was applied across the wire screens, the screen to which the sample was attached, $S_1$ being made negative. The hydrogen gas was then pumped off until a discharge started between the screens and a glow spread over the cathode. When a pressure of 1–3 millimeters of mercury was attained, a cone of intense glow occurred in each of the ¼″ square openings in the cathode screen. A current of 75 milliamperes at 490 volts was observed to flow between the screens. This treatment was continued for 2 minutes. After an interval of about 5 minutes during which all current was off but the vacuum was maintained, copper was evaporated as described in Example I. A highly adherent deposit of copper on both sides of the resin film was obtained. The coated film was subsequently heated in air for 2 minutes at 200° C. to produce a decorative mottled color in the deposit ranging from copper-yellow through magenta to purple.

Similar results were obtained when a sample of polytetrafluoroethylene resin film was attached to the positive screen during electrical excitation.

*Example IV*

A sample of polytetrafluoroethylene resin film was treated as in Example I for a period of 4 minutes employing a voltage of 500 volts between electron gun and screens. Excitation was then discontinued with both gun and accelerating voltage turned off. After about 2 minutes during which vacuum was maintained, copper was evaporated onto the sample, producing an adherent coating which exhibited a peel-strength of 6.0–6.5 lbs./linear inch.

The peel strength was determined by cementing the external copper surface of an inch wide strip of the coated sample to a flat-fixed object, partly peeling the perfluorocarbon resin layer back from one end of the copper coating, and measuring with a spring balance the slowly applied force necessary to peel off the perfluorocarbon resin layer back over the still adhering portion of the resing layer, the peeling force being applied in a direction parallel to the surface of the coated sample.

Another sample of polytetrafluoroethylene in the form of a disk or resin approximately ⅛-inch thick and 1-inch in diameter was coated with copper as described above and additional cooper electroplated thereon by the method described in "Modern Electroplating." The Electrochemical Society, special volume, Ware Bros. Co., Philadelphia, p. 158. The electroplated film was rinsed with water and dried. This film adhered strongly to the resin as indicated by the fact that electrical leads could be attached using rosin-core solder and were firmly anchored to the resin.

*Example V*

A coating of copper was produced on a film prepared from tetrafluoroethylene/hexafluoropropylene copolymer by the method described in Example I. A potential of 10 volts and a current of 200 milliamperes was employed and evaporation of copper was carried out during electrical excitation. Strongly adherent coatings having peel strengths of 6–8 lbs./linear inch as determined by the procedure of Example IV are produced on both sides of the film by this procedure.

Similar coatings prepared by evaporation of copper onto copolymer film without electrical excitation were much less adherent.

*Example VI*

A disk, approximately 1 inch in diameter and ⅛ inch thick, composed of polytetrafluoroethylene resin was coated with an adherent layer of gold by the process described in Example I, except that the gas present in the vacuum chamber was air instead of hydrogen. The accelerating voltage for the electron beam was 500 volts and the gold was evaporated during the electrical excitation. A control sample was treated similarly except that electrical excitation was omitted and no accelerating voltage was applied.

The gold coating applied in the presence of the electrical excitation adhered firmly to the polytetrafluoroethylene resin disk; gold deposited in a similar manner on the untreated disk could be readily brushed off.

The examples describe the preparation of copper and gold coatings on articles fabricated from perfluoroolefin resins. The process of this invention is not limited to the use of these particular metals; any metal which can be evaporated under the conditions described may be employed. Examples of other metals which are useful are: silver, chromium, platinum, palladium, iron, nickel, and aluminum.

The fact that the process of this invention is carried out at voltages of 500 volts and below offers many advantages. For example, the power source can be constructed of low-cost available components. The insulation on lead-in wires is standard and special insulation capable of withstanding higher voltages is not required. In practice, operation at low voltages has no deleterious effect on the treated articles and entails less power consumption than when voltages above 500 volts are employed.

The products of this invention which comprise articles fabricated from perfluoroolefin polymers having metal coatings directly and firmly attached to the surface thereof are particularly useful in electrical applications. The fact that the metal coating can be directly attached to the perfluoroolefin resin surface without any intermediate layer of adhesive is of great importance, since it enables full advantage to be taken of the outstanding electrical and high temperature properties of the resin.

Specific instances in which the valuable properties of metallized perfluoroolefin resin articles can be utilized are in the fabrication of dielectric wave guides and wave guide windows where the low dielectric constant and the resultant low reflectance of the resin are particularly advantageous. The high dielectric strength of the resins renders metal-coated articles useful as capacitors. In all these applications, the low dielectric loss, the exceedingly low moisture absorption and the outstanding high temperature properties of the resins render the components useful under conditions which cause breakdown when other dielectrics are employed. Thus, components employing metal-coated perfluoroolefin resin are especially valuable in miniaturized equipment being used in aircraft to replace both coaxial cable and wave-guides at frequencies ranging from about 200 to at least 10,000 megacycles. Furthermore, soldered connections can be made to the metal coatings without damage to the underlying resin.

I claim:

1. The method for metallizing a perfluorocarbon resin surface which comprises subjecting said surface initially to a rarified plasma of electrically energized gaseous particles until a glow discharge is produced, subsequently to a rarified plasma of electrically energized gaseous particles at a pressure of 1 to 3 millimeters/Hg at a potential of 10 to 500 volts for a time of from 10 to 600 seconds, and thereafter evaporating a metal thereon.

2. Method according to claim 1 wherein said gaseous particles are hydrogen particles.

3. Method according to claim 1 wherein said metal is a noble metal.

4. Method according to claim 1 wherein said perfluorocarbon resin is a copolymer of tetrafluoroethylene and hexafluoropropylene.

References Cited in the file of this patent

UNITED STATES PATENTS

| 2,553,289 | Alexander et al. | May 15, 1951 |
| 2,689,805 | Croze et al. | Sept. 21, 1954 |
| 2,810,933 | Pierce et al. | Oct. 29, 1957 |
| 2,864,755 | Rothacker | Dec. 16, 1958 |
| 2,923,964 | Plonsky | Feb. 9, 1960 |

FOREIGN PATENTS

| 686,031 | Great Britain | Jan. 14, 1953 |
| 768,554 | Great Britain | Feb. 20, 1957 |
| 771,234 | Great Britain | Mar. 27, 1957 |

OTHER REFERENCES

Godley: "Metal Coatings by High Vacuum Evaporation," The Iron Age, April 1, 1948, pp. 90–94, page 94 relied on.

Holland: "Vacuum Deposition of Thin Films," 1956, John Wiley and Sons, N.Y., pages 65, 66, 75 and 78 relied on.